United States Patent
Gao et al.

(10) Patent No.: US 9,756,439 B2
(45) Date of Patent: Sep. 5, 2017

(54) METHOD AND DEVICES FOR OUTPUTTING AN AUDIO FILE

(71) Applicant: Tencent Technology (Shenzhen) Company Limited, Shenzhen (CN)

(72) Inventors: Shundong Gao, Shenzhen (CN); Jingxian Guan, Shenzhen (CN); Xin Xie, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/786,172

(22) PCT Filed: Jun. 24, 2014

(86) PCT No.: PCT/CN2014/080620
§ 371 (c)(1),
(2) Date: Oct. 22, 2015

(87) PCT Pub. No.: WO2014/206275
PCT Pub. Date: Dec. 31, 2014

(65) Prior Publication Data
US 2016/0100267 A1    Apr. 7, 2016

(30) Foreign Application Priority Data

Jun. 25, 2013  (CN) .......................... 2013 1 0256256

(51) Int. Cl.
*A61F 11/06*    (2006.01)
*H04R 29/00*    (2006.01)
(Continued)

(52) U.S. Cl.
CPC .............. *H04R 29/00* (2013.01); *G10L 15/26* (2013.01); *H04M 1/72558* (2013.01); *H04M 2250/12* (2013.01); *H04R 2430/01* (2013.01)

(58) Field of Classification Search
USPC ................ 381/71.14, 56, 58, 104, 317, 94.5
See application file for complete search history.

(56) References Cited

U.S. PATENT DOCUMENTS 7,917,178 B2 *  3/2011  Watson ............. H04M 1/72522
                                                       345/2.3
8,811,574 B2 *  8/2014  Mikan ................. H04L 12/5815
                                                       379/88.14

FOREIGN PATENT DOCUMENTS

CN      101180673 A       5/2008
KR   10-2004-0017863 A    3/2004

OTHER PUBLICATIONS

Search Report mailed Mar. 14, 2015 by the Chinese Patent Office in Application No. 201310256256.4.
(Continued)

*Primary Examiner* — Yosef K Laekemariam
(74) *Attorney, Agent, or Firm* — Anova Law Group, PLLC

(57) ABSTRACT

Methods and devices for flexible and adaptable outputting of audio files in text or audio format based on certain parameters are described. Before delivering an acquired audio file to a user, the methods and devices described herein detect a current value of a pre-specified parameter, such as an environmental noise parameter, a mute setting parameter, a ring tone setting parameter, an audio/video playback parameter, or a setting parameter of an application acquiring the audio file, and compare the current value of the pre-specified parameter with a preset condition for the same parameter. The methods and devices described herein with output the audio file or a text file created from the audio file depending on the result of the comparison.

18 Claims, 5 Drawing Sheets

(51) Int. Cl.
*H04M 1/725* (2006.01)
*G10L 15/26* (2006.01)

(56) References Cited

OTHER PUBLICATIONS

Notification of the First Office Action mailed Mar. 24, 2015 by the Chinese Patent Office in Application No. 201310256256.4.
Notification of the Second Office Action mailed Sep. 16, 2015 by the Chinese Patent Office in Application No. 201310256256.4.

* cited by examiner

METHOD AND DEVICES FOR OUTPUTTING AN AUDIO FILE

CROSS REFERENCE TO RELATED APPLICATIONS

This international application claims priority to Chinese Patent Application No. 201310256256.4, filed Jun. 25, 2013, the entire contents of which are incorporated herein by reference.

TECHNICAL FIELD

The disclosure generally relates to the field of communications and, more particularly, to methods and devices for outputting an audio file.

BACKGROUND

A conventional communication terminal can support audio applications, including, e.g., receiving an audio file and playing the audio file to present content of the audio file to a user. Many terminals may also convert the audio file into a text file to present the content of the audio file to the user. In conventional communication terminals, however, the way the user receives the audio file is preset, and does not depend on any specific parameters. As such, the user may receive an audio file in a format this is not optimal. If the user is in a noisy environment and the parameter is set for the user to receive audio files, for example, the communication terminal will play the audio file, which the user may not be able to hear. In other situations, the user may be in an environment where it is difficult to read text files. What is needed are methods and devices for flexible and adaptable delivery of audio files in text or audio format based on certain parameters.

SUMMARY

According to a first aspect of the present disclosure, there is provided an output method for an audio file, comprising: acquiring an audio file; detecting a current value of a pre-specified parameter; and comparing the current value of the pre-specified parameter with a preset condition, and outputting an object file corresponding to the current value of the pre-specified parameter based on a comparison result, the object file including the audio file or a text file converted from the audio file.

According to a second aspect of the present disclosure, there is provided an output device for an audio file, comprising: a processor; and a memory for storing instructions executable by the processor; wherein the processor is configured to: acquire an audio file; detect a current value of a pre-specified parameter; and compare the current value of the pre-specified parameter with a preset condition, and output an object file corresponding to the current value of the pre-specified parameter based on a comparison result, the object file including the audio file or a text file converted from the audio file.

According to a third aspect of the present disclosure, there is provided a non-transitory computer-readable medium having stored therein instructions that, when executed by a processor of a device, cause the device to perform an output method for an audio file, the method comprising: acquiring an audio file; detecting a current value of a pre-specified parameter; and comparing the current value of the pre-specified parameter with a preset condition, and outputting an object file corresponding to the current value of the pre-specified parameter based on a comparison result, the object file including the audio file or a text file converted from the audio file.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the inventions and, together with the description, serve to explain the principles of the inventions.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the inventions. Instead, they are merely examples of apparatuses and methods consistent with aspects related to the inventions as recited in the appended claims.

Figure 1:
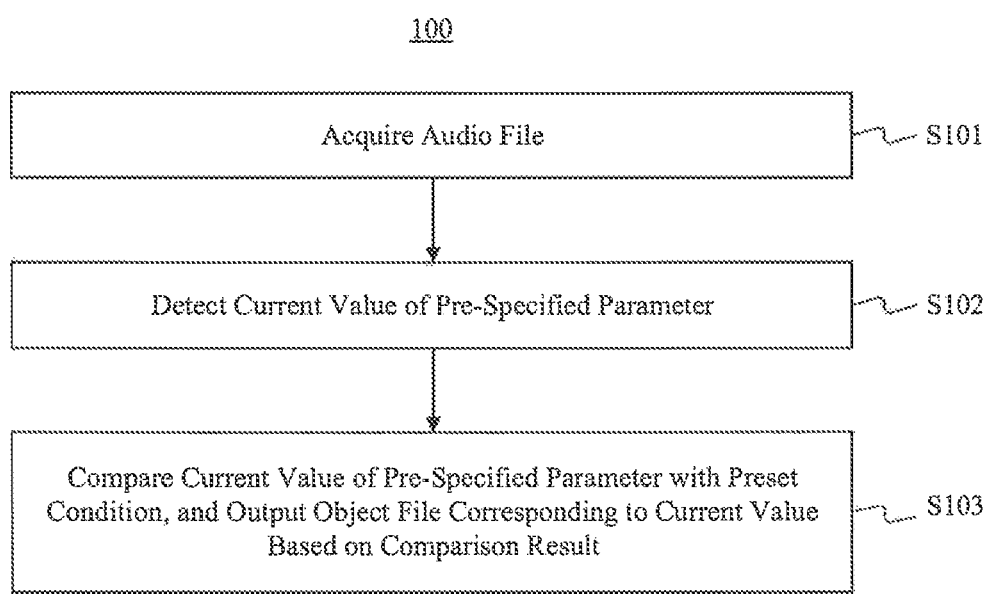
FIG. 1 is a flowchart of a method for outputting an audio file, according to an exemplary embodiment.

FIG. 1 is a flowchart of an method 100 for outputting an audio file for use in a device, according to an exemplary embodiment. Referring to FIG. 1, the method 100 includes the following steps.

In step S101, the device acquires an audio file. For example, the audio file can be acquired through a network, e.g., the audio file is acquired via an instant messaging (IM) application from a communication platform, or is acquired from a recording device, e.g., being transferred from the recording device with a distance close to the present device, or acquired from a storage device. Also for example, the audio file can include, e.g., a piece of conversation or music.

In step S102, the device detects a current value of a pre-specified parameter. For example, the pre-specified parameter can be a parameter specified via an input operation by a user, or a parameter specified via a received command from a network transmission. The pre-specified parameter may affect the user reading content of the audio file. For example, the pre-specified parameter can be a parameter of the device performing the method 100, e.g. a setting parameter of the device, or a parameter of an external environment of the device, e.g., an external noise.

In step S103, the device compares the current value of the pre-specified parameter with a preset condition, and outputs an object file corresponding to the current value based on a comparison result. For example, the object file includes the audio file or a text file converted from the audio file. Also for example, the object file can be an object file corresponding to the current value of the pre-specified parameter as indicated in a predetermined mapping relationship. The mapping relationship is a mapping relationship between the value of the pre-specified parameter and the outputted audio file, and/or a mapping relationship between the value of the pre-specified parameter and the outputted text file.

If the object file corresponding to the current value of the pre-specified parameter is the audio file, step S103 includes a direct playback of the audio file. If the object file corresponding to the current value is the text file converted from the audio file, step S103 includes converting the audio file into the text file, and outputting the text file.

The method 100 can be used in any terminal supporting audio functions. Accordingly, the device performing the method 100 can be, e.g., a tablet computer, a mobile phone, an electronic reader, a remote control, a personal computer (PC), a notebook computer, automotive equipment, a network television, a wearable device, or any other intelligent equipment with network functions.

In the method 100, the audio file or the text file converted from the audio file is outputted according to the current value of the pre-specified parameter. Thus, an output mode of the audio file can be adjusted according to the current value of the pre-specified parameter, to flexibly present content of the audio file to the user in different ways, which facilitates obtaining the content of the audio file by the user.

Figure 2:
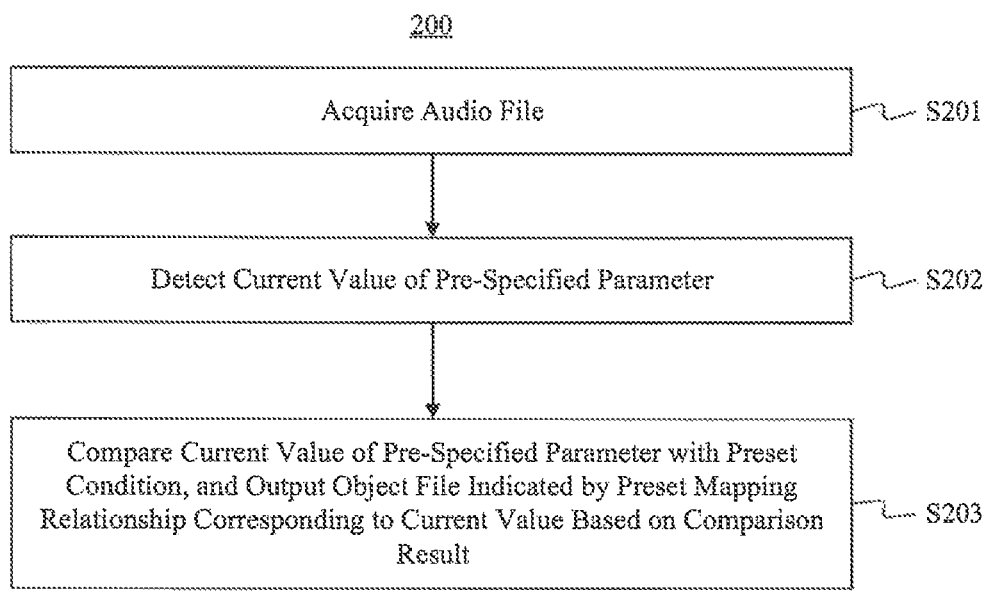
FIG. 2 is a flowchart of a method for outputting an audio file, according to an exemplary embodiment.

FIG. 2 is a flowchart of a method 200 for outputting an audio file for use in a device, according to an exemplary embodiment. Referring to FIG. 2, the method 200 includes the following steps.

In step S201, the device acquires an audio file. For example, the audio file can be acquired through a network, e.g., the audio file is acquired via an instant messaging (IM) application from a communication platform, or is acquired from a recording device, e.g., being transferred from the recording device with a distance close to the present device, or acquired from a storage device. Also for example, the audio file can include, e.g., a piece of conversation or music.

In step S202, the device detects a current value of a pre-specified parameter. For example, the pre-specified parameter can be a parameter specified via an input operation by a user, or a parameter specified via a received command from a network transmission. The pre-specified parameter may affect the user obtaining content of the audio file. For example, the pre-specified parameter can be a parameter of the device performing the method 100, e.g., a setting parameter of the device, or a parameter of an external environment of the device, e.g., an external noise.

In step S203, the device compares the current value of the pre-specified parameter with a preset condition, and outputs an object file indicated by a preset mapping relationship corresponding to the current value based on a comparison result. For example, the object file includes the audio file or a text file converted from the audio file. Also for example, the mapping relationship is a mapping relationship between the value of the pre-specified parameter and the outputted audio file, and/or a mapping relationship between the value of the pre-specified parameter and the outputted text file.

If the object file corresponding to the current value of the pre-specified parameter is the audio file, step S203 includes a direct playback of the audio file. If the object file corresponding to the current value is the text file converted from the audio file, step S203 includes converting the audio file into the text file, and outputting the text file.

In exemplary embodiments, the pre-specified parameter can comprise at least one of an environmental noise parameter, a mute setting parameter, a ring tone setting parameter, an audio/video playback parameter, or a setting parameter of an application acquiring the audio file.

In one exemplary embodiment, the pre-specified parameter includes the environmental noise parameter. Accordingly, step S202 includes detecting a noise value of the environmental noise parameter by a microphone (MIC) of the device. Correspondingly, step S203 includes, if the noise value is greater than a first threshold value, outputting the text file and, if the noise value is smaller than or equal to the first threshold value, outputting the audio file. For example, if the noise value is greater than the first threshold value, outputting the text file converted from the audio file, and displaying the text file, if the noise value is smaller than or equal to the first threshold value, directly playing the audio file.

In this way, step S203 can implement outputting the text file in the environment with a greater noise value, and the noise in the environment will have less effect on the user reading the text file. For example, when the user carries the device on a noisy street, the device converts the audio file into the text file, and outputs the text file. Step S203 can also implement playing the audio file in the environment with a smaller noise value. For example, when the user carries the device in a quiet environment, the device directly plays the audio file.

In one exemplary embodiment, the pre-specified parameter includes the mute setting parameter. Accordingly, step S202 includes detecting a current value of the mute setting parameter. Correspondingly, step S203 includes, if the current value of the mute setting parameter indicates a mute status, outputting the text files and, if the mute setting parameter indicates a non mute status, outputting the audio file.

For example, if the current value of the mute setting parameter indicates the mute status, it means that the user wants a quiet environment or does not want to disturb others, such as in a conference room or other places where user terminals are required to be mute. Accordingly, the device converts the audio file into the text file. As a result, the user can read the content of the text file without producing any noise.

In one exemplary embodiment, the pre-specified parameter includes the ring tone setting parameter. Accordingly, step S202 includes detecting a ring tone volume value of the ring tone setting parameter. Correspondingly, step S203 includes, if the ring tone volume value is smaller than or equal to a second threshold value, outputting the text file and, if the ring tone volume value is greater than the second threshold value, outputting the audio file.

For example, if the ring tone volume value is smaller than or equal to the second threshold value, it means that the user sets the ring tone volume to a relatively low level, which indicates that the user may be in an environment where loud sound is not allowed. In this case, step S203 converts the audio file into the text file, and displays the text file. If the ring tone volume value is greater than the second threshold value, it means that the user sets the ring tone volume to a relatively high level, which indicates that the user may be in an environment where loud sound is allowed. In this case, step S203 directly plays the audio file.

In one exemplary embodiment, the pre-specified parameter includes the audio/video playback parameter. Accordingly, step S202 includes detecting a current value of audio/video playback parameter. Correspondingly, step S203 includes, if the current value of the audio/video playback parameter meets a preset condition, outputting the text file and, if the current value of the audio/video playback parameter does not meet the preset condition, outputting the text file. The audio/video playback parameter can be an audio playback parameter or a video playback parameter.

For example, if the current value of the audio/video playback parameter indicates a currently played audio or video, it means that the device is playing the audio or the video, and it may be inconvenient for the user to listen to the audio file. In this case, step S203 converts the audio file into the text file, and displays the text file. The user can read the content of the text file while listening to the audio or watching the video.

In one exemplary embodiment, the pre-specified parameter includes the setting parameter of the application acquiring the audio file. Accordingly, step S202 includes detecting a current value of the setting parameter. Correspondingly, step S203 includes, if the current value of the setting parameter meets a preset condition that the application is unsuitable for outputting the audio file, outputting the text file and, if the current value of the setting parameter meets a preset condition that the application is suitable for outputting the audio file, outputting the audio file.

For example, the application is unsuitable for outputting the audio file because the application is set in a mute status, or a reminder message of the application is set in a mate status. That is to say, the application may be unsuitable for directly outputting the audio file in the current status. In this case, step S203 converts the audio file into the text file, and displays the text file. Also for example, the application is suitable for outputting the audio file when a login account of an application is online, or the reminder message is set to be a voice reminder. In this case, step S203 directly plays the audio file.

In exemplary embodiments, the device detects current values of multiple pre-specified parameters, such as multiple ones of the environmental noise parameter, the mute setting parameter, the ring tone setting parameter, the audio/video playback parameter, and the setting parameter.

In one exemplary embodiment, the pre-specified parameters include the environmental noise parameter and the mute setting parameter. Accordingly, step S202 includes detecting the noise value of the environment noise parameter and the current value of the mute setting parameter. Correspondingly, step S203 includes determining whether the noise value is greater than the first threshold value, if not, outputting the audio file, and if yes, further determining whether the current value of the mute setting parameter indicates a mute status. If the current value of the mute setting parameter is determined to indicate the mute status, the text file is output. If the current value of the mute setting parameter is determined to indicate a non-mute status, the audio file is output.

In one exemplary embodiment, the pre-specified parameters include the ring tone setting parameter and the environment noise parameter. Accordingly, step S202 includes detecting a ring tone volume value of the ring tone setting parameter and a noise value of the environment noise parameter. Correspondingly, step S203 includes determining whether the ring tone volume value is greater than the second threshold value, if yes, outputting the audio file and, if no, determining whether the noise value is greater than the first threshold value. If the noise value is greater than the first threshold value, the text file is output. If the noise value is smaller than the first threshold value, the audio file is output.

In exemplary embodiments, the pre-specified parameters can also be a combination of the ring tone setting parameter and the audio/video playback parameter, a combination of the ring tone setting parameter and the setting parameter of the device, etc.

The method 200 can be used in any terminal supporting audio functions. Accordingly, the device performing the method 200 can be, e.g. a tablet computer, a mobile phone, an electronic reader, a remote control, a personal computer (PC), a notebook computer, automotive equipment, a network television, a wearable device, or any other intelligent equipment with network functions.

In the method 200, an output mode of the audio file is adjusted according to the current value of the pre-specified parameter, to flexibly present content of the audio file to the user in different ways, which facilitates the user obtaining the content of the audio file.

Figure 3:
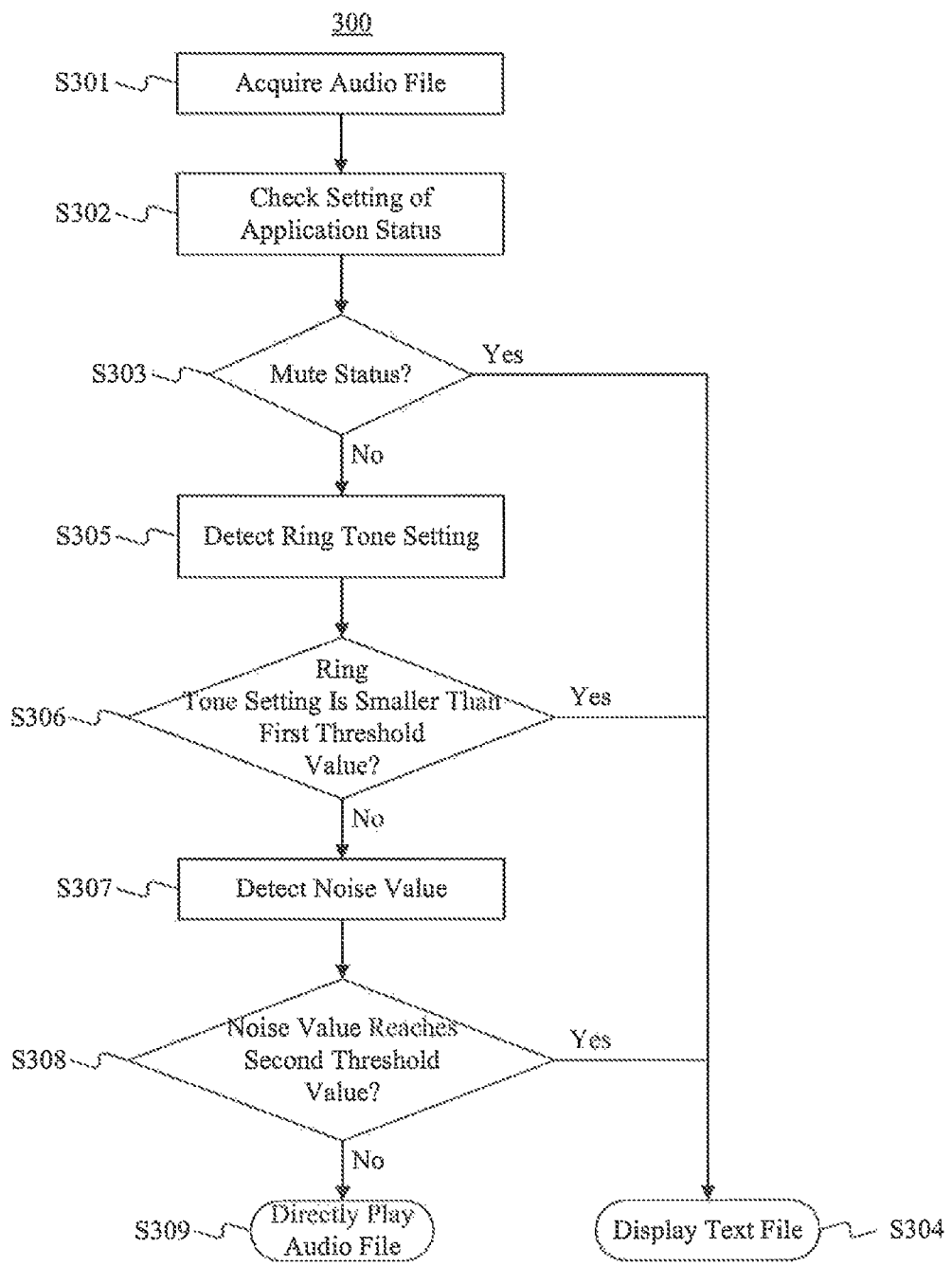
FIG. 3 is a flowchart of a method for outputting an audio file, according to an exemplary embodiment.

FIG. 3 is a flowchart of a method 300 for outputting an audio file for use in a device, according to an exemplary embodiment. Referring to FIG. 3, the method 300 includes the following steps.

In step S301, the device acquires an audio file.

In step S302, the device checks a setting of an application status. The application status can be a status of an application that acquires the audio file, or a status of the device performing the method 300.

In step S303, the device determines whether the setting of the application status is a mute status, if yes, performing step S304 and, if no, performing step S305.

In step S305, the device detects a ring tone setting.

In step S306, the device determines whether the ring tone setting is smaller than a first threshold value, if yes, performs step S304 and, if no, performs step S307.

In step S307, the device detects a noise value.

In step S308, the device determines whether the noise value reaches a second threshold value, if yes, performs step S304, and if no, performs step S309.

In step S304, the device outputs text of the audio file. For example, the device converts the audio file into a text file, and displays the text file.

In step S309, the device directly plays the audio file.

Figure 4:
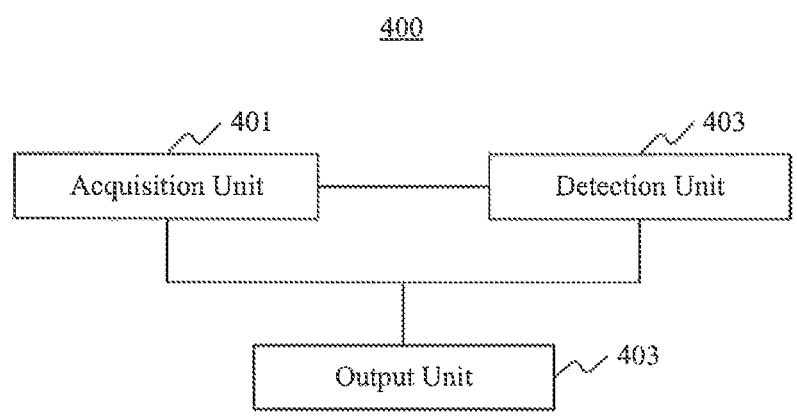
FIG. 4 is a block diagram of an output device for an audio file, according to an exemplary embodiment.

FIG. 4 is a block diagram of an output device 400 for an audio file, according to an exemplary embodiment. Referring to FIG. 4, the device 400 comprises an acquisition unit 401, a detection unit 402, and an output unit 403.

The acquisition unit 401 is configured to acquire an audio file. For example, the audio file can be acquired through a network, e.g., the audio file is acquired via an instant messaging (IM) application from a communication platform, or is acquired from a recording device, e.g., being transferred from the recording device with a distance close to the device 400. Also for example, the audio file can include, e.g., apiece of conversation or music.

The detection unit 402 is configured to detect a current value of a pre-specified parameter. For example, the pre-specified parameter can be a parameter specified via an input operation by a user, or a parameter specified via a received command from a network transmission. The pre-specified parameter may affect the user obtaining content of the audio file. For example, the pre-specified parameter can be a parameter of the device 400, e.g., the setting parameter of the device 400, or a parameter of an external environment of the device 400, e.g., an external noise.

The output unit 403 is configured to compare the current value of the pre-specified parameter with a preset condition, and output an object file corresponding to the current value based on a comparison result. For example, the object file includes the audio file or a text file converted from the audio file. The object file can be an object file corresponding to the current value as indicated in a predetermined mapping relationship. Also for example, the mapping relationship is a mapping relationship between the value of the pre-specified parameter and the outputted audio file, and/or a mapping relationship between the value of the pre-specified parameter and the outputted text file.

If the object file corresponding to the current value of the pre-specified parameter is the audio file, the output unit 43 performs a direct playback of the audio file. If the object file corresponding to the current value is the text file converted from the audio file, the output unit 43 converts the audio file into the text file, and output the text file.

In exemplary embodiments, the pre-specified parameter can comprise at least one an environmental noise parameter, a mute setting parameter, a ring tone setting parameter, an audio/video playback parameter, a setting parameter of an application acquiring the audio file.

In one exemplary embodiment, the pre-specified parameter includes the environmental noise parameter. Accordingly, the detection unit 402 detects a noise value of the environmental noise parameter. If the noise value is greater than a first threshold value, the output unit 403 outputs the text file. If the noise value is smaller than or equal to the first threshold value, the output unit 403 outputs the audio file. For example, if the noise value is greater than the first threshold, the output unit 403 converts the audio file into the text file and displays the text file. If the noise value is smaller than or equal to the first threshold value, the output unit 403 directly playbacks the audio file.

In this way, the output unit 403 can implement outputting the text file in the environment with a greater noise value, and the noise in the environment will have less effect on the user reading the text file. For example, when the user carries the device 400 on a noisy street, the output unit 403 converts the audio file into the text file, and outputs the text file. The output unit 403 can also implement playing the audio file in the environment with a smaller noise value. For example, when the user carries the device 400 in a quiet environment, the output unit 403 directly plays the audio file.

In one exemplary embodiment, the pre-specified parameter includes the mute setting parameter. Accordingly, the detection unit 402 detects a current value of the mute setting parameter. The output unit 403 outputs the text file if the current value of the mute setting parameter meets a preset condition indicating a mute status, and outputs the audio file if the current value of the mute setting parameter meets the preset condition indicating a non-mute status.

For example, if the current value of the mute setting parameter indicates the mute status, it means that the user wants a quiet environment or does not want to disturb others, such as in a conference room or other places where user terminals are required to be mute. Accordingly, the output unit 403 converts the audio file into the text file. As a result, the user can read the content of the text file without producing any noise.

In one exemplary embodiment, the pre-specified parameter includes the ring tone setting parameter. The detection unit 402 detects a ring tone volume value of the ring tone setting parameter. The output unit 403 outputs the text file if the ring tone volume value is smaller than or equal to a second threshold value, and outputs the audio file if the ring tone volume value is greater than the second threshold value.

For example, if the ring tone volume value is smaller than or equal to the second threshold value, it means that the user sets the ring tone volume to a relatively low level, which indicates that the user may be in an environment where loud sound is not allowed. In this case, the output unit 403 converts the audio file into the text file, and displays the text file, if the ring tone volume value is greater than the second threshold value, it means that the user sets the ring tone volume to a relatively high level, which indicates that the user may be in an environment where loud sound is allowed. In this case, the output unit 403 directly plays the audio file.

In one exemplary embodiment, the pre-specified parameter includes the audio/video playback parameter. The detection unit 402 detects a current value of the audio/video playback parameter. The output unit 403 outputs the text file if the current value of the audio/video playback parameter meets a preset condition indicating a currently played audio or video, and outputs the audio file if the current value of the audio/video playback parameter meets the preset condition indicating an audio or video not being played.

For example, if the current value of the audio/video playback parameter indicates a currently played audio or video, it means that the device 400 is playing an audio or video, and it may be inconvenient for the user to listen to the audio file. In this case, the output unit 403 converts the audio file into the text file, and displays the text file. In this way, the user can read the content of the text file while listening to the audio or watching the video.

In one exemplary embodiment, the pre-specified parameter includes the setting parameter of the application acquiring the audio file. The detection unit 402 detects the current value of the setting parameter. The output unit 403 outputs the text file if the current value of the setting parameter meets a preset condition indicating that the application is unsuitable for outputting the audio file, and outputs the audio file if the current value of the setting parameter meets the preset condition indicating that the application is suitable for outputting the audio file.

For example, the application is unsuitable for outputting the audio file because the application is set in a mute status, or a reminder message of the application is set in a mute status. That is to say, the application may be unsuitable for directly outputting the audio file in the current status. In this case, the output unit 403 converts the audio file into the text file, and displays the text file. Also for example, the application is suitable for outputting the audio file when a login account of the application is online, or the reminder message of the application is set as a voice reminder. In this case, the output unit 403 directly plays the audio file.

In exemplary embodiments, the detection unit 402 detects current values of multiple pre-specified parameters, such as multiple ones of the environmental noise parameter, the mute setting parameter, the ring tone setting parameter, the audio/video playback parameter, and the setting parameter of the application acquiring the audio file.

In one exemplary embodiment, the pre-specified parameters include the environmental noise parameter and the mute setting parameter. The detection unit 402 detects the noise value of the environment noise parameter and the current value of the mute setting parameter. The output unit 403 determines whether the noise value is greater than the first threshold value. If not, the output unit 403 outputs the audio file. If yes, the output unit 403 determines whether the current value of the mute setting parameter indicates a mute status. If the current value of the mute setting parameter indicates the mute status, the output unit 403 outputs the text file. If the current value of the mute setting parameter indicates a non-mute status, the output unit 403 outputs the audio file.

In one exemplary embodiment, the pre-specified parameter includes the ring tone setting parameter and the environment noise parameter. The detection unit 402 detects a ring tone volume value of the ring tone setting parameter and a noise value of the environment noise parameter. The output unit 403 determines whether the ring tone volume value is greater than the second threshold value. If yes, the output unit 403 outputs the audio file. If no, the output unit 403 determines whether the noise value is greater than the first threshold value. If the noise value is greater than the first threshold value, the output unit 403 outputs the text file. If the noise value is smaller than or equal to the first threshold value, the output unit 403 outputs the audio file.

In exemplary embodiments, the pre-specified parameters can also include a combination of the ring tone setting parameter and the audio/video playback parameter, a combination of the ring tone setting parameter and the setting parameter of the application acquiring the audio file, etc.

In exemplary embodiments, the device 400 can be any terminal that supports audio functions, e.g., a tablet computer, a mobile phone, an electronic reader, a remote control, a personal computer (PC), a notebook computer, automotive equipment, a network television, a wearable device, or any other intelligent equipment with network functions.

Figure 5:
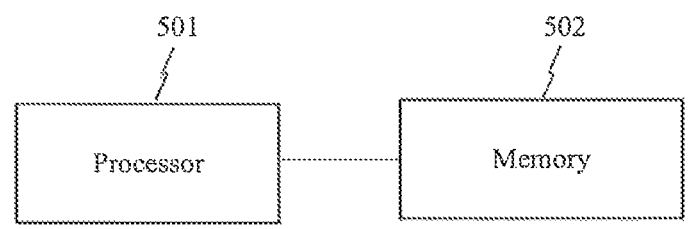
FIG. 5 is a block diagram of an output device for an audio file, according to an exemplary embodiment.

FIG. 5 is a block diagram of an output device 500 for an audio file, according to an exemplary embodiment. For example, the device 500 can be a tablet computer, a mobile phone, an electronic reader, a remote control, a personal computer (PC), a notebook computer, automotive equipment, a network television, a wearable device, or any other intelligent equipment with network functions. Referring to FIG. 5, the device 500 includes a processor 502 and a memory 504 for storing data as well as for storing instructions for performing the above described methods, and otherwise facilitating operation of the processor 502.

In exemplary embodiments, there is also provided a non-transitory computer-readable storage medium including instructions, such as included in the memory 504, executable by the processor 502, for performing the above-described methods for instant messaging. For example, the storage medium can be a disk, a CD-ROM, a read-only memory, a random access memory and so on.

One of ordinary skill in the art will understand that the above described units can each be implemented by hardware, or software, a combination of hardware and software. One of ordinary skill in the art will also understand that multiple ones of the above described units may be combined as one unit, and each of the above described units may be further divided into a plurality of sub-units.

Other embodiments of the inventions will be apparent to those skilled in the art from consideration of the specification and practice of the inventions disclosed here. This application is intended to cover any variations, uses, or adaptations of the inventions following the general principles thereof and including such departures from the present disclosure as come within known or customary practice in the art. It is intended that the specification and examples be considered as exemplary only, with a true scope and spirit of the inventions being indicated by the following claims.

It will be appreciated that the present inventions are not limited to the exact construction that has been described above and illustrated in the accompanying drawings, and that various modifications and changes can be made without departing from the scope thereof. It is intended that the scope of the inventions only be limited by the appended claims

The invention claimed is:

1. A method for outputting an audio file, comprising:
 acquiring, by a user terminal, an audio file;
 detecting a current value of a pre-specified parameter, wherein the pre-specified parameter comprises at least one of a ring tone setting parameter and an environmental noise parameter; and
 comparing the current value of the pre-specified parameter with a preset condition, and outputting an object file corresponding to the current value of the pre-specified parameter based on a comparison result, the object file including the audio file or a text file converted from the audio file;
 wherein the method further comprises:
 detecting a ring volume value of the ring tone setting parameter;
 if the ring volume value is greater than a second threshold value,
  detecting, by the user terminal, a noise value of the environmental noise parameter;
  if the detected noise value is smaller than or equal to a first threshold, outputting the audio file; and
  if the detected noise value is greater than the first threshold value, outputting the text file; and
 if the ring volume value is smaller than or equal to the second threshold value, outputting the text file.

2. The method of claim 1, wherein the pre-specified parameter further comprises at least one of a mute setting parameter, a media playback parameter, and a setting parameter of an application acquiring the audio file.

3. The method of claim 2, wherein when the pre-specified parameter comprises the mute setting parameter, detecting the current value of the pre-specified parameter comprises:
 detecting a current value of the mute setting parameter.

4. The method of claim 3, wherein comparing the current value with the preset condition and outputting the object file comprising:
 if the current value of the mute setting parameter meets the preset condition indicating a mute status, outputting the text file; and
 if the current value of the mute setting parameter meets the preset condition indicating a non-mute status, outputting the audio file.

5. The method of claim 2, wherein when the pre-specified parameter comprises the media playback parameter, detecting the current value of the pre-specified parameter comprises:
 detecting a current value of the audio/video playback parameter.

6. The method of claim 5, wherein comparing the current value with the preset condition and outputting the object file comprise:
 if the current value of the media playback parameter meets the preset condition indicating a currently played audio or video, outputting the text file; and
 if the current value of the media playback parameter meets the preset condition indicating an audio or video not being played, outputting the audio file.

7. The method of claim 2, wherein when the pre-specified parameter comprises the setting parameter of the application acquiring the audio file, detecting the current value of the pre-specified parameter comprises;
 detecting a current value of the setting parameter of the application acquiring the audio file.

8. The method of claim 7, wherein comparing the current value with the preset condition and outputting the object file comprise:

if the current value of the setting parameter meets the preset condition indicating that the application is unsuitable for outputting the audio file, outputting the text file; and
if the current value of the setting parameter meets the preset condition indicating that the application is suitable for outputting the audio file, outputting the audio file.

9. An output device for an audio file, comprising:
a processor; and
a memory for storing instructions executable by the processor;
wherein the processor is configured to:
acquire an audio file;
detect a current value of a pre-specified parameter, wherein the pre-specified parameter comprises at least one of a ring tone setting parameter and an environmental noise parameter; and
compare the current value of the pre-specified parameter with a preset condition, and output an object file corresponding to the current value of the pre-specified parameter based on a comparison result, the object file including the audio file or a text file converted from the audio file;
wherein the processor is further configured to:
detecting a ring volume value of the ring tone setting parameter;
if the ring volume value is greater than a second threshold value,
detect a noise value of the environmental noise parameter;
if the detected noise value is smaller than or equal to a first threshold, output the audio file; and
if the detected noise value is greater than the first threshold value, output the text file; and
if the ring volume value is smaller than or equal to the second threshold value, output the text file.

10. The device of claim 9, wherein the pre-specified parameter further comprises at least one of a mute setting parameter, a media playback parameter, and a setting parameter of an application acquiring the audio file.

11. The device of claim 10, wherein when the pre-specified parameter comprises the mute setting parameter, the processor is further configured to:
detect a current value of the mute setting parameter;
if the current value of the mute setting parameter meets the preset condition indicating a mute status, output the text file; and
if the current value of the mute setting parameter meets the preset condition indicating a non-mute status, output the audio file.

12. The device of claim 10, wherein when the pre-specified parameter comprises the media playback parameter, the processor is further configured to:
detect a current value of the media playback parameter;
if the current value of the media playback parameter meets the preset condition indicating a currently played audio or video, output the text file; and
if the current value of the media playback parameter meets the preset condition indicating an audio or video not being played, output the audio file.

13. The device of claim 10, wherein when the pre-specified parameter comprises the setting parameter of the application acquiring the audio file, the processor is further configured to:
detect a current value of the setting parameter of the application acquiring the audio file;
if the current value of the setting parameter meets the preset condition indicating that the application is unsuitable for outputting the audio file, output the text file; and
if the current value of the setting parameter meets the preset condition indicating that the application is suitable for outputting the audio file, output the audio file.

14. A non-transitory computer-readable medium having stored therein instructions that, when executed by a processor of a device, cause the device to perform a method for outputting an audio file, the method comprising:
acquiring, by the device, an audio file;
detecting a current value of a pre-specified parameter, wherein the pre-specified parameter comprises at least one of a ring tone setting parameter and an environmental noise parameter; and
comparing the current value of the pre-specified parameter with a preset condition, and outputting an object file corresponding to the current value of the pre-specified parameter based on a comparison result, the object file including the audio file or a text file converted from the audio file;
wherein the method further comprises:
detecting a ring volume value of the ring tone setting parameter;
if the ring volume value is greater than a second threshold value,
detecting, by the device, a noise value of the environmental noise parameter;
if the detected noise value is smaller than or equal to a first threshold, outputting the audio file; and
if the detected noise value is greater than the first threshold value, outputting the text file; and
if the ring volume value is smaller than or equal to the second threshold value, outputting the text file.

15. The method of claim 1, wherein:
the noise value of the environmental noise parameter is detected after the ring volume value is determined to be greater than the second threshold value.

16. The method of claim 1, wherein:
a type of the pre-specified parameter is identified via an input operation by a user.

17. The method of claim 1, wherein:
a type of the pre-specified parameter is identified via a received command from a network transmission.

18. The method of claim 1, wherein the pre-specified parameter further comprises a mute setting parameter; and the method further comprises:
before detecting the ring volume value, detecting a current value of the mute setting parameter;
if the current value of the mute setting parameter meets the preset condition indicating a mute status, directly outputting the text file; and
if the current value of the mute setting parameter meets the preset condition indicating a non-mute status, performing the step of detecting the ring volume value.

* * * * *